(12) United States Patent
Freytag (10) Patent No.: US 12,285,890 B2
(45) Date of Patent: Apr. 29, 2025

(54) METHOD FOR THE PRODUCTION OF A REINFORCED THERMOPLASTIC CONTAINER

(71) Applicant: AGCO International GmbH, Neuhausen (CH)

(72) Inventor: Erich Freytag, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 225 days.

(21) Appl. No.: 17/709,959

(22) Filed: Mar. 31, 2022

(65) Prior Publication Data
US 2022/0314501 A1 Oct. 6, 2022

(30) Foreign Application Priority Data
Apr. 1, 2021 (GB) ...................................... 2104726

(51) Int. Cl.
*B29C 41/20* (2006.01)
*B29C 41/04* (2006.01)
(Continued)

(52) U.S. Cl.
CPC .............. *B29C 41/20* (2013.01); *B29C 41/04* (2013.01); *B60K 15/03177* (2013.01);
(Continued)

(58) Field of Classification Search
CPC ................................ B29C 41/04; B29C 41/20
See application file for complete search history.

(56) References Cited

U.S. PATENT DOCUMENTS 3,774,812 A * 11/1973 Lemelson ............... B29C 41/20
222/211
4,023,257 A * 5/1977 Wright .................... B29C 41/20
264/277
(Continued)

FOREIGN PATENT DOCUMENTS

FR 2919581 A1 2/2009
GB 561819 A 6/1944
(Continued)

OTHER PUBLICATIONS

UK Intellectual Property Office, Search report for related UK Application No. GB2104726.1, dated Jan. 7, 2022.

*Primary Examiner* — Edmund H Lee (57) ABSTRACT

An internally reinforced thermoplastic container has a body manufactured using rotational molding. Prior to molding, attachment elements are releasably attached to the interior surface of parts of a mold, and an initially separate tension member is connected between the attachment elements. The mold is closed and a body of the container molded such that the attachment elements are integrated into the walls of the body. After molding, the attachment elements are released from the mold. The attachment elements and the tension member define a tension structure to resist outward bulging of the container walls. The tension member may be tensioned prior to or after molding of the container body. The attachment elements may take the form of eyelets having a base incorporated into the wall of the container body. The method enables the formation of a hollow thermoplastic container with integrally formed internal reinforcement.

19 Claims, 4 Drawing Sheets

(51) Int. Cl.
 *B60K 15/03* (2006.01)
 *B29K 101/12* (2006.01)
 *B29L 31/00* (2006.01)

(52) U.S. Cl.
 CPC ... *B29K 2101/12* (2013.01); *B29L 2031/7172* (2013.01); *B60K 2015/03493* (2013.01)

(56) References Cited

U.S. PATENT DOCUMENTS

| | | | | |
|---|---|---|---|---|
| 4,517,231 | A * | 5/1985 | May | B65D 90/52 |
| | | | | 220/532 |
| 7,427,000 | B2 | 9/2008 | Austerhoff et al. | |
| 7,985,362 | B2 * | 7/2011 | Lawrence | B29C 41/04 |
| | | | | 264/250 |
| 9,617,034 | B2 | 4/2017 | Heidemeyer et al. | |

FOREIGN PATENT DOCUMENTS

| | | | |
|---|---|---|---|
| JP | 2007276265 | * | 10/2007 |
| WO | WO2007/024146 | * | 3/2007 |

* cited by examiner

METHOD FOR THE PRODUCTION OF A REINFORCED THERMOPLASTIC CONTAINER

CROSS-REFERENCE TO RELATED APPLICATION

This application claims the benefit of the filing date of U.K. Patent Application 2104726.1, "Method for the Production of a Reinforced Thermoplastic Container," filed Apr. 1, 2021, the entire disclosure of which is incorporated herein by reference.

FIELD

The present disclosure relates to a method of manufacturing containers out of a thermoplastic material. More particularly, the present disclosure relates to a method of manufacturing containers from a thermoplastic material which have a reinforcing tension structure inside the container.

BACKGROUND

It is known to use hollow containers made from thermoplastic material for storing a fluid, especially for storing a fuel, on a range of agricultural machines, such as tractors, combines, forage harvesters, and also in construction machines. It is preferable that vehicles of this type carry enough fuel to accommodate uninterrupted operating periods of, e.g., 10 hours and more before the machine needs to be refueled. This can require the use of large volume fuel containers. Since the installation space of these machines is limited, fuel containers are often designed to fit closely about the outer contours of the other components of the machines to make the most efficient use of the available space. This results in containers having unique and irregular shapes, which may not be inherently stable. Therefore, it is common to reinforce a container with special tension members to increase its stability and prevent bulging of the containers' outer walls. However, these special reinforcements are sometimes difficult to apply. The unique container forms can also result in particular weak points in a container, which are difficult to reinforce because they are hard to reach from the outside of the container or because there isn't enough space to reinforce these points. This can result in a reinforcement process which is very time consuming, leading to unacceptable costs.

A common option to achieve a greater stability and to prevent bulging is to use external straps or other tension members like rods, which interact with the outer walls of the container. Use of such external reinforcement is disadvantageous as it takes up more space, which is limited in most cases. Furthermore, external reinforcing requires multiple assembly steps in sometimes hard-to-reach positions, resulting in a higher manufacturing time and costs. It is also known to locate tension members internally in a container to increase stability. An example of this is shown in U.S. Pat. No. 7,427,000, "Compressed Gas Tank for a Motor Vehicle," granted Sep. 23, 2008, in which tie elements are connected between opposing walls of a metal tank. Incorporating tie elements in the manner described increases the complexity of the manufacturing process and may create a leak point if not properly sealed. All these drawbacks are not desirable.

For a containers molded from plastic materials, a hollow cross-member or tunnel may be integrated into the container connecting opposing walls. However, if the cross-member is not aligned in the direction of the demolding, a separate insert is needed. This adds additional manufacturing time and additional tooling costs. A further significant drawback is that such cross-members reduce the internal volume of the container available for storing fluid.

U.S. Pat. No. 9,617,034, "Container of Thermoplastic Material," granted Apr. 11, 2017, discloses a container of thermoplastic material having a support that extends between and is connected to opposing walls of the container. The support comprises at least one support strut extending between bases located on the opposing container walls. The support strut is operative in compression to support a load induced on the walls by a negative pressure in the container. A tensile force induced by positive pressure in the container is absorbed by at least one tension-resistant bracing element, which also extends between the opposing container walls. The tension-resistant bracing element is formed as a continuous band laced over holding brackets at the bases to pre-stress the bases against the support strut. This reinforcing arrangement is complex, resulting in a time-consuming and difficult manufacturing process. The use of internal struts in the form of hollow tubes reduces the internal volume of the container.

United Kingdom Patent 561,819 A, "Improvements in Flexible Containers for Transporting Gas," granted Jun. 6, 1944, discloses a flexible gas container for motor vehicles, which is inflated as a gas is filled into the container. The sides of the container are braced with flexible tension members attached one end to the inner walls. All flexible tension members are connected at their other ends to an annulus of elastic cord. This annulus is stretched when the container is full of gas and imparts tension to the flexible members to hold the walls against outward bulging or distortion. The flexible members are preferably designed as stout ropes and are anchored to the inner wall of the container. A disadvantage with this system is that multiple tension members need to be vulcanized inside of the container and simultaneously connected to the annulus. This arrangement is not suitable for application to hollow containers made from thermoplastic material, which are not inflatable in the manner described. Furthermore, the number of manufacturing steps to vulcanize multiple tension members inside of a rigid container is impractical, especially since the attachment points may be difficult to reach, for example if the container has an irregular shape.

It is an objective of the present disclosure to provide an alternative method for manufacturing a container from a thermoplastic material which overcomes, or at least reduces, some or all of the limitations of known methods.

It is also an objective of the present disclosure to provide an alternative method for manufacturing a container from a thermoplastic material which enables internal reinforcement to be incorporated into a container more easily than the known methods.

It is furthermore an objective of the present disclosure to provide an alternative container made from a thermoplastic material having internal reinforcement which is easier to manufacture than known containers.

BRIEF SUMMARY

In accordance with a first aspect of the present disclosure, a method of manufacturing a reinforced thermoplastic container includes providing a mold having at least two mold parts, each mold part having an inner side and an outer side; releasably securing at least one attachment element to the inner side of one of the mold parts; connecting a tension member to the at least one attachment element; adding a thermoplastic material onto the inner side of at least one of the at least two mold parts; closing the at least two mold parts to produce a mold cavity; heating the thermoplastic material; and distributing the thermoplastic material at the inner side of the at least two mold parts to create a molded body of the reinforced container.

After molding, the at least one attachment element is fixedly integrated into a wall of the container body.

The at least one attachment element may comprise a base for attachment to the inner surface of the mold part and bracket to which the tension member is connected. The bracket may be a hook, a clamp, an eyelet, or any other device, which is able to hold the tension member in place. At least the base portion of the attachment element may be made from the same or a compatible thermoplastic material as used to form the container body.

In an embodiment, the method comprises use of a securing element to secure the attachment element to the inner side of the at least one mold part. The securing element may be applied to the outer side of the at least one mold part. The method may comprise connecting a base of the attachment element to an end of the securing element, and the securing element may extend through a wall of a mold part and protrude beyond an inner surface of the wall.

The securing element may comprise a threaded fastener inserted from outside of the at least one mold part through an aperture in the mold part to engage with a thread on the at least one attachment element. The aperture may be threaded. Alternatively, the securing element may be a safety pin, a magnet, a device with a bayonet connection, or another device able to attach the attachment element to the inner side of the mold part and be released from outside of the mold.

The method may comprise rotating the mold about two perpendicular axes in a cardanic fashion to evenly distribute the heated thermoplastic material over the internal surfaces of the mold parts. In other words, the container body may be molded using rotational molding techniques. Other methods to distribute the thermoplastic material could also be possible, for example blow molding. The thermoplastic material may be distributed evenly on the inner side of the at least two mold parts to form a container with a nearly even wall thickness.

The method may comprise allowing the thermoplastic material to cool after it has been distributed over the inner side of the at least two mold parts to define the body of the container and subsequently detaching the at least one attachment element from the mold part. The method may comprise cooling the mold to allow the thermoplastic material to cool and set.

In an embodiment, the method comprises attaching at least two attachment elements to at least one of the mold parts and connecting the tension member between a plurality of the attachment elements. At least one attachment element may be attached to each of the at least two mold parts. At least two attachment elements may be located so as to be positioned on opposing walls of the container body in the completed container.

The tension member may be connected alternately to attachment elements located so as to be attached to opposing sides of the container body in the completed container.

The method may comprise connecting the tension member between a plurality of attachment elements in a meandering pattern.

The tension member can be attached to the attachment element(s) by a material-based connection (chemical bond) or without one. If the tension member is attached to the attachment element(s) by a material-based connection, then the tension member may be formed of the same thermoplastic material as that used to form the container body. In this case, the tension member may be bonded to the attachment elements during distribution of the heated thermoplastic material. However it is also possible that the tension member is made from another suitable material and is connected attached to the attachment elements in a different way, for example by gluing. Alternatively, the tension member can be mechanically connected to the attachment element(s), for example by pulling it through an eyelet, or by hooking it up or any other way. If at least some of the attachment elements are in the form of eyelets or hooks, the tension member may be fixed at its ends and passed through a series of attachment elements in succession so that it is held in tension between each consecutive pair of attachment elements in the series. Ends of the tension member may be secured together to form a closed loop and hold the tension member in tension. Alternatively, at least one end may be secured to a first attachment element. The other end may also be secured to an attachment element, which may be a different attachment element from the first attachment element, or it may be secured to another part of the tension member or to some other fixture in the container body.

In an embodiment, the tension member is initially connected to the attachment elements while the mold parts are still open. At least one end of the tension member is then led to the outside of the mold parts to be tensioned and fixated. Preferably, the at least one end is led out of the mold a point which defines part of the container which is not visible during the normal operation of the container. The tension member can be led to the outside of the mold for example between the edges of the mold parts which come in contact with each other once the mold parts are closed and the mold cavity is formed, or by extending through a wall of one of the mold parts, e.g. through an aperture in the mold part. In an embodiment, both ends of the tension member are led to the outside so a closed loop can be formed by connecting the two ends. After one or both ends of the tension member have been secured in position outside the mold, the mold parts are closed and the molding process begins. This arrangement can be used for example if only two opposing walls are to be secured against bulging. In this case, only one attachment element is needed on a first side. The tension member is attached to this attachment element and both ends of the tension member extend on the other side through a wall of the mold. There they are tensioned and fixated. After the container body is removed from the mold, the ends of the tension member may be permanently secured together outside of the container body to hold the tension member in tension or the ends may become fused as part of the opposing wall of the container. Therefore it is possible to reinforce the container with only one attachment element. In other embodiments, multiple attachment elements are used.

Various ways to fixate the at least one end of the tension member outside of the mold parts are possible, for example using a clamp or any other suitable device.

The method may comprise tensioning the tension member. The tension member may be tensioned before or after molding the container body.

The tension member may be made from the same or a compatible thermoplastic material as is used to form the container body. In which case, the method may be configured such that during molding of the container body, the at least one tension member becomes fixed to each of the attachment elements by a chemical bond.

The method may comprise locating at least one end of the tension member outside of the mold prior to molding of container body. The method may comprise tensioning the tension member and securing the at least one end outside of the mold prior to molding the container body.

The method may comprise tensioning and fixing the tension member within the mold cavity prior to molding the container body. In an embodiment, at least one of the mold parts comprises a port having an openable closure member, the method comprising accessing the mold cavity through the port after the mold parts have been brought together in order to tension and fix the tension member within the mold cavity.

In an embodiment, the method comprises distributing thermoplastic material on the tension member and the at least one attachment element to form at least one cross brace within the body of the container.

The at least one tension member may be flexible when in a tension-free state. The at least one tension member may be a tension rope.

Though at least one tension member is used, depending on the container design multiple tension members can be used. It is also possible to connect multiple tension members to the same attachment element.

The attachment elements may be located at specific positions so that in the finished container, the attachment elements and tension member define an internal spatial tension structure that inhibits the container walls from bulging outward due to a positive internal pressure. These positions are for example possible weak points of the container, where the risk of bulging is higher. For example, these positions may be located at widespread sidewalls of the container having a low material stress, such as the middle of a widespread side wall. Therefore a stable container can be created, which doesn't require time-consuming actions to install conventional reinforcing devices afterwards and whereby the tension members only displace a relatively small volume.

In another method of manufacturing a thermoplastic container having an internal tension structure, a mold is used comprising at least two mold parts which are assembled together to define a mold cavity to mold a body of the container from a thermoplastic material. Prior to molding of the container body, a plurality of attachment elements are releasably secured to inner surfaces of the mold parts at positions which define walls of the container body. An elongate tension member is connected between a plurality of the attachment members such that after molding of the container body, the attachment elements are integrated into the walls of the container and interconnected by the tension member.

The method may comprise releasing the attachment elements from the mold parts after the container body has been molded to enable the container body to be de-molded.

In the method according to the second aspect, the method may comprise tensioning the tension member prior to molding of the container body. In this case, at least one end of the tension member may be directed outside of the mold. This end of the tension member may be used to tension the tension member after the parts of the mold have been brought together to define the mold cavity and secured to hold the tension member in tension while the container body is molded. Alternatively, the mold may be provided with means to access the mold cavity after the mold parts are brought together, and the method may comprise tensioning the tension member within the mold cavity after the mold parts are brought together. At least one of the parts of the mold may have a port with an openable closure member that can be opened to allow access to the mold cavity to tension the tension member, and closed prior to molding of the container body.

If the tension member is tensioned prior to molding of the container body, the tension member may be bonded or mechanically secured to the attachment elements after tensioning. The tension member may be secured to the attachment elements by an adhesive. Alternatively, the tension member may be bonded to the attachment elements by the thermoplastic material during molding of the container body.

In the method according to the second aspect, the tension member may be tensioned after molding of the container body. In this case, at least one end of the tension member may be directed outside of the mold. The tension member may be lightly tensioned, and the at least one end secured in position outside the mold prior to molding of the container body. At least one end of the tension member may be used to finally tension the tension member after the container body has been molded. The at least one end may be secured within the container body after the tension member has been tensioned. The method may comprise trimming the at least one end of the tension member after tensioning of the tension member.

If at least one end of the tension member is directed outside the mold before molding of the container body, the at least one end of the tension member may be directed out of the mold at a location in which a section of the container body to be removed after molding is produced. This might be part of an inlet for the container, and the section of the container body may be removed to produce an inlet aperture for the container. If the tension member is tensioned after molding of the container body, the at least one end may be used to tension the tension member after that section of the container has been removed so as to release the at least one end.

The attachment elements may each have a base integrated into a wall of the container body during molding and an attachment portion to which the tension member is attached. At least the base may be made of the same, or a compatible, thermoplastic material as that used to form the container body. The attachment portion may be a bracket such as an eyelet or hook through which the tension member is passed. Differently formed attachment elements may be used.

In accordance with a third aspect of the disclosure, there is provided a reinforced thermoplastic container for storing a fluid, whereby the container is manufactured according to the method of either of the first and second aspects of the disclosure.

In an embodiment, the least one attachment element is integrally molded into a wall of the container body.

The container may be a fuel tank for an agricultural machine such as a tractor.

An advantage of some disclosed embodiments is the ability to easily and inexpensively add reinforcement for a container by modifying an otherwise already finished molding in a late stage of the development process.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any particular agricultural machine, container, or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

Figure 1:
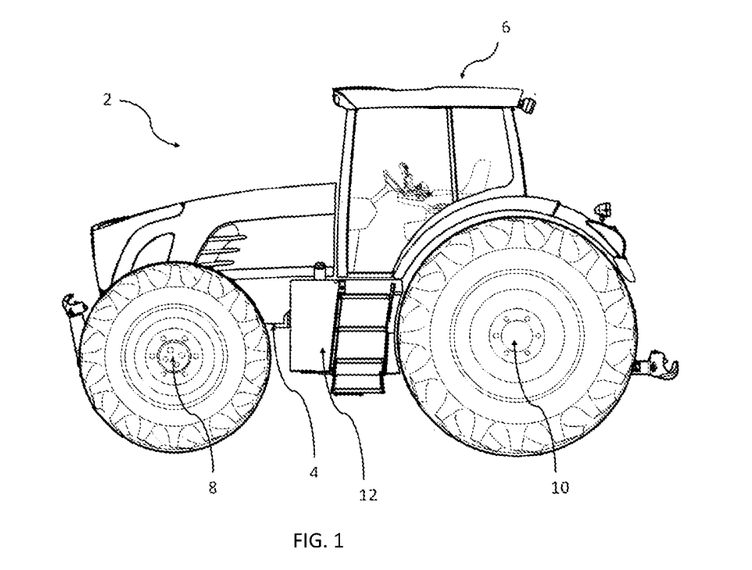
FIG. 1 is a side view of an agricultural machine in the form of a tractor, including a thermoplastic container used as a fuel tank and which is manufactured as disclosed herein.

FIG. 1 shows a representation of an agricultural machine 2 in the form of a tractor. The agricultural machine 2 has a chassis 4, a cab 6, a front axle 8, a rear axle 10, and a hollow thermoplastic container 12 for storing a fuel.

Figure 2:
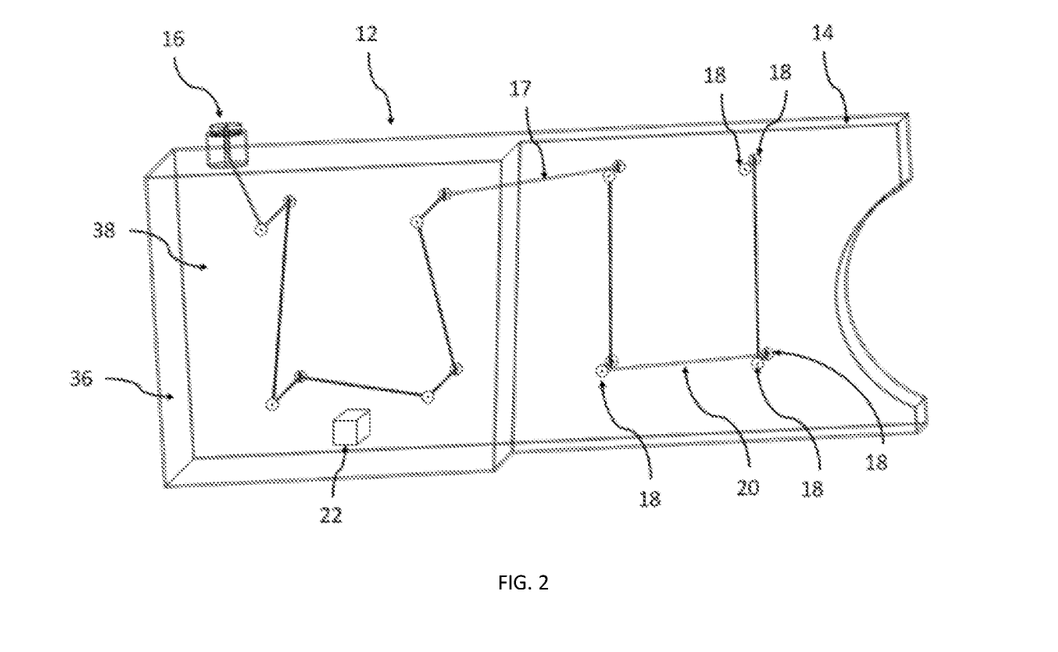
FIG. 2 is a perspective view of a container with an internal reinforcing tension structure suitable for use with the agricultural machine of FIG. 1, the walls of the container being ghosted to show the internal reinforcing tension structure.
Figure 3:
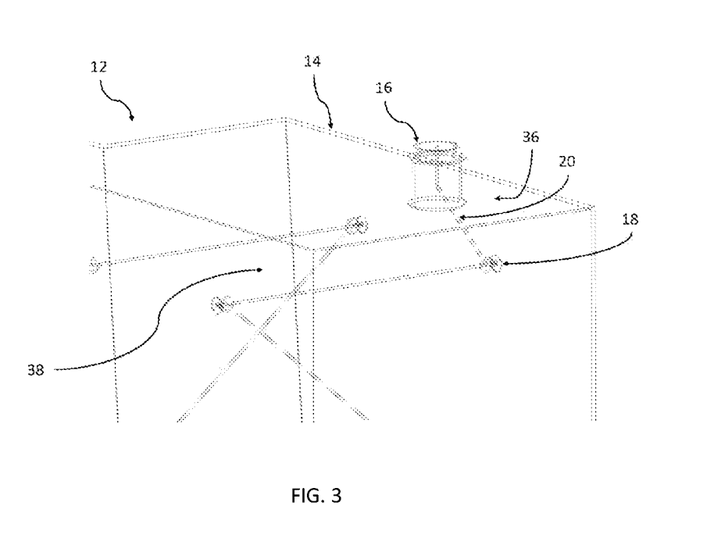
FIG. 3 is a closer view of part of the container of FIG. 2 showing detail of an inlet of the container.
Figure 4:
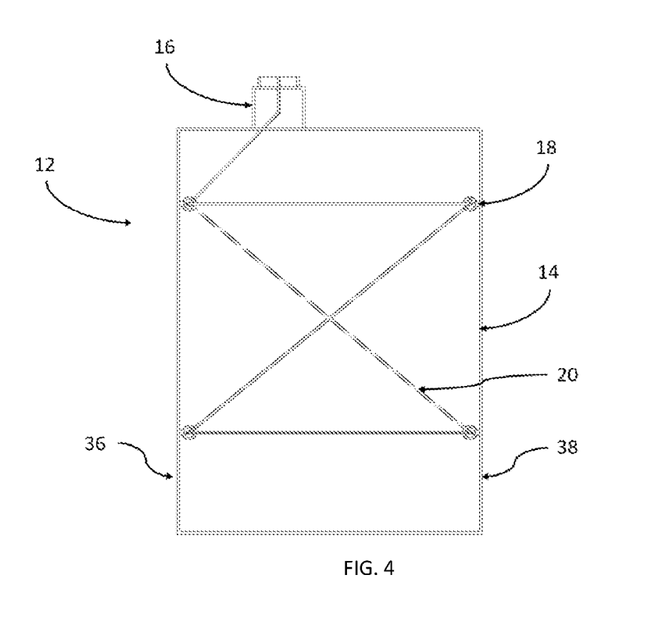
FIG. 4 is a side view of the container of FIGS. 2 and 3.
Figure 5:
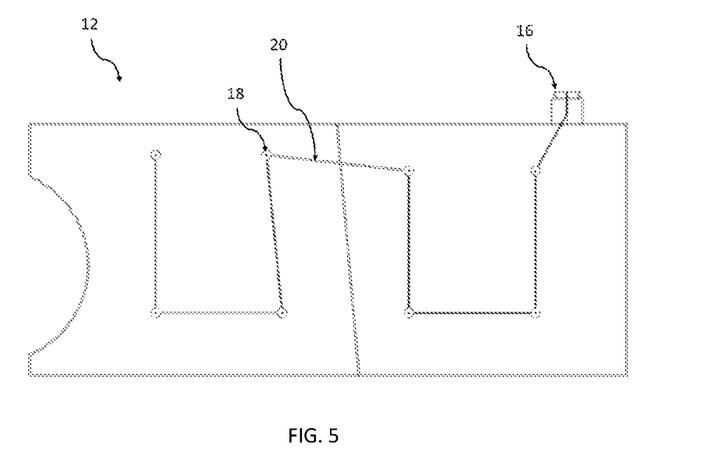
FIG. 5 is a second side view of the container of FIGS. 2 to 4.

The container 12 has a main body 14 molded from a thermoplastic material, as illustrated in FIG. 2. The container main body 14 defines an internal storage volume and an inlet 16 to allow access to interior volume. The container body 14 can be manufactured using a rotational molding technique as is well known in the art. Since rotational molding is a known method of manufacturing hollow components such as containers from a thermoplastic material, the process will not be described in detail. However, briefly, a mold 24 comprises two or more mold parts 26a, 26b (shown in FIG. 6) which can be brought together define a mold cavity 32 defining the desired shape of the container 12. A thermoplastic material is introduced into at least one of the mold parts 26a, 26b. The mold parts 26a, 26b are then closed and the thermoplastic material is heated till it is flowable. The closed mold 24 is rotated around two perpendicular axes in a cardanic fashion to evenly distribute the heated thermoplastic material over the internal surfaces 28 of the mold parts 26a, 26b. Once the thermoplastic material has been evenly distributed, the mold 24 and the thermoplastics material are cooled. Once the thermoplastic material has cooled down and solidified, the mold parts 26a, 26b are opened and the partially finished container body 14 is extracted. Initially after molding, the inlet 16 is closed and material is cut from the inlet 16 to form an opening. The basic process as briefly outlined above can be modified in accordance with any suitable adaptations known in the art.

The container 12 as so far described is conventional and for use as a fuel tank on a tractor will typically have a large internal volume and an irregular shape. Such a container 12 may have a tendency to bulge outwardly when full if not provided with additional reinforcement. In accordance with the disclosure, the method of manufacture as described above is modified so as to produce an integrated, internal spatial tension structure 17 that gives the container 12 stability and reduces bulging.

As illustrated in FIG. 2, the spatial tension structure 17 comprises a number of attachment elements 18 integrally molded into the walls of the container 12 and an elongate tension member 20 connected between the attachment elements 18. The attachment elements 18 are distributed about the interior surface of the container 12, with some being located on opposing walls of the container 12. The tension member 20 is in the form of a tension rope or cable, which is flexible when not in tension. In use, the tension member 20 acts in tension where it connects between any two of the attachment elements 18 to resist those attachment elements 18 from separating along the line of the tension member 20. Where the attachment elements 18 are located on opposite (e.g., facing) walls of the container 12, this will help to resist the walls bulging outward. As shown most clearly in FIG. 7, the attachment elements 18 may be in the form of eyelets through which the tension member 20 is threaded. A single tension member 20 may be used to interconnect all of the attachment elements 18. However, in alternative arrangements, more than one tension member 20 can be used.

Attempting to incorporate the spatial tension structure 17 as described above into a container 12 after molding would be difficult and could potentially create leakage points where fluid can exit the container 12. To prevent this, the method of manufacture as described above is modified so that the tension structure 17 is at least partially incorporated as an integral part of the container 12 as it is molded.

The modified manufacturing process will now be described with reference to FIGS. 6 and 7 in particular.

Figure 6:
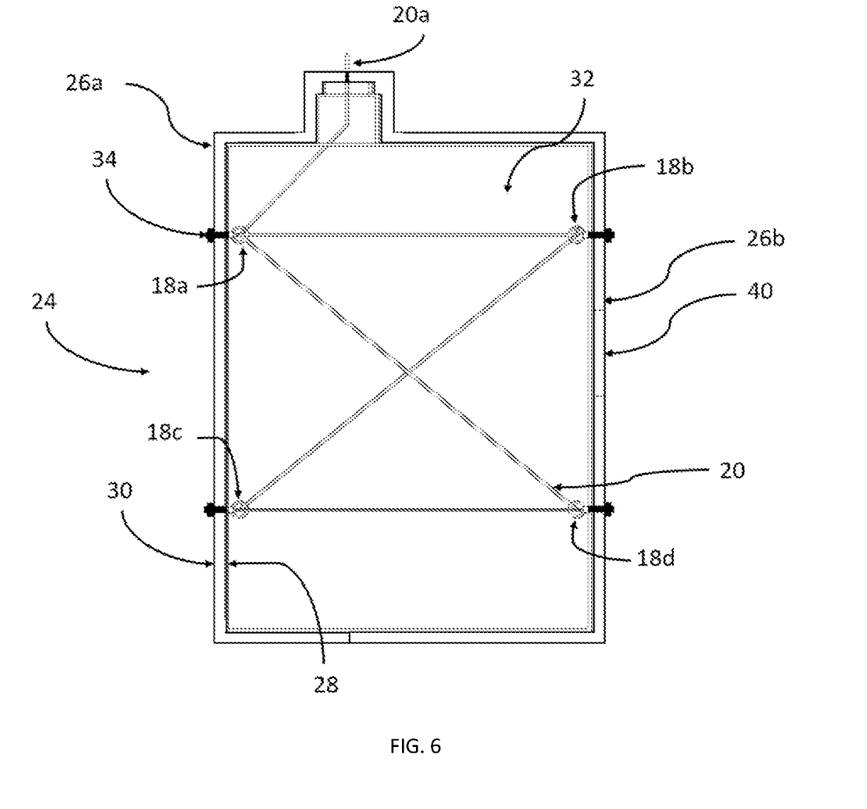
FIG. 6 is a sectional view through a mold for forming the container of FIGS. 2 to 5, in which at least part of an internal reinforcing tension structure for the container has been incorporated into the mold prior to molding the container.

FIG. 6 shows a sectional view of a mold 24 for producing a container 12 using a rotational molding method. The mold 24 has two parts 26a, 26b which each have an inner surface 28 and an outer surface 30. The inner surfaces 28 of the mold parts define a mold cavity 32 when the parts 26a, 26b are assembled together. Prior to the two mold parts 26a, 26b being assembled together, a number of attachment elements 18 are secured to the inner surfaces 28 of the mold parts 26a, 26b at locations corresponding to the positions of the attachment elements 18 in the completed container 12. Four attachment elements 18a to 18d are illustrated in FIG. 6 for the purposes of describing the methodology, but it should be appreciated that the number and location of the attachment elements 18 can be varied to provide a desired level of structural stability for any given container design.

Figure 7:
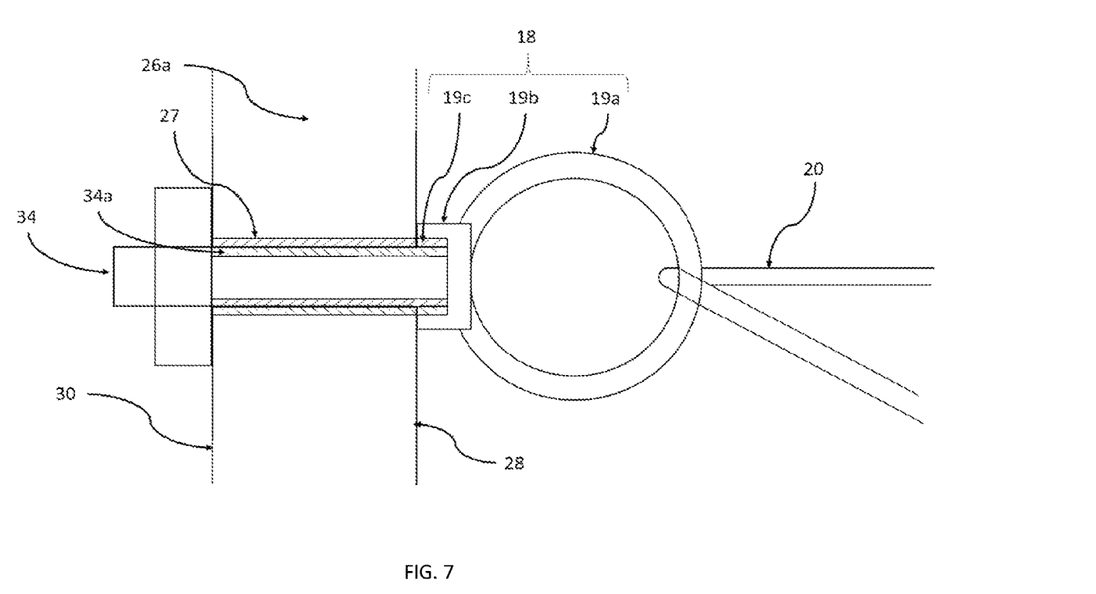
FIG. 7 is a partial view on an enlarged scale of part of the mold of FIG. 6 showing detail of one arrangement for securing an attachment element forming part of the reinforcing structure to the mold.

As illustrated in an enlarged view in FIG. 7, in the present embodiment the attachment elements 18 are in the form of eyelets, each having a ring or bracket 19a and a base 19b. The base 19b is in the form of a part cylinder having a central circular recess or bore with an internal thread 19c. An aperture with a matching internal thread 27 extends through a wall of the mold part 26a at the position where an attachment element 18 is to be located. Each attachment element 18 is secured to the inner surface 28 of a mold part 26a, 26b by means of a respective releasable fastening 34 in the form of a bolt or screw having a head portion and a shank with an external thread 34a. The external thread 34a corresponds to the internal threads 19c, 27 of the attachment element 18 and aperture. The bolt 34 is inserted from the exterior of the mold part 26a and is screwed into the internal thread 27 of the aperture until an end of the shank projects beyond the interior surface 28 of the mold part where it engages the internal thread 19c of the base 19b of the attachment element. The bolt 34 is tightened to securely clamp the base 19b to the inner surface 28 of the mold part so that no leakage can occur during molding.

Other arrangements for releasably securing an attachment element 18 to the mold 24 can be adopted, such as a bayonet fitting for example. If the material from which the attachment elements 18 are made permits, they could be secured in position using magnetic attraction. In this case, a suitable material could be incorporated into the base 19b. The attachment elements 18 could also be secured using a non-permanent adhesive or the like or indeed by any other suitable method. A mixture of different methods for securing the attachment elements 18 to the inner surfaces of the mold parts can be used. Further, it will be appreciated that the attachment elements 18 can take other forms than an eyelet, such as a hook or indeed any suitably shaped bracket 19a to which the tension member 20 can be connected and tensioned.

Once all the attachment elements 18 are secured to the mold parts 26a, 26b and before the mold parts 26a, 26b are fully closed, the tension member 20 is connected between the attachment elements 18 in a suitable pattern to provide the required structural stability. In the exemplary embodiment illustrated in FIG. 6, the four attachment elements 18a, 18b, 18c, 18d are shown arranged generally at the corners of a square, with two 18a, 18c attached to the inner surface of one of the mold parts 26a which will form a first wall of the container and the other two 18b, 18d attached to the inner surface of the other of the mold parts 26b which will form a second wall of the container opposing the first wall. In the example illustrated, a first end of the tension member 20 is secured to a first one of the eyelets 18a on a first of the mold parts 26a. The first end of the tension member 20 may be bonded to the attachment element 18, secured using a mechanical fastening, tied to the eyelet, or secured in any other suitable manner. The tension member 20 is threaded through the remaining eyelets, extending in a lateral direction to an opposing second eyelet of a second attachment element 18b on the opposite mold part 26b, in a diagonal fashion to a third eyelet of a third attachment element 18c on the first mold part 26a, passing in a lateral direction to a fourth eyelet of a fourth attachment element 18d on the second mold part 26b opposite from the third eyelet before passing in a diagonal manner back through the first eyelet. The second end 20a of the tension member 20 extends out of the mold 24 between the mold parts 26a, 26b where they define the inlet 16 so that it locates where a section of the molded container 12 which is to be removed after molding is to be produced. Once the tension member 20 has been attached to all the eyelets and the required thermoplastic material to form the container 12 introduced into at least one of the mold parts 26a, 26b, the mold parts 26a, 26b are fully closed. Using the second end region 20a of the tension member 20 which protrudes from the mold 24, the tension member 20 is stretched to place it in tension and fixed in position using a suitable clamp. Other components 22 which are to be integrated into the molded container may also be secured to the inner surface 28 of one or other of the mold parts 26a, 26b. This might include, for example, metal flanges for holding sensors or withdrawal units and the like.

The container 12 is now molded using known rotational molding techniques. Briefly, the thermoplastic material is heated until it is flowable. Then the mold 24 is rotated in a cardanic fashion around two perpendicular axes so that the heated flowable thermoplastic material is distributed almost evenly over the inner walls 28 of the mold parts 26a, 26b so that a hollow container 12 having outer walls of a nearly even thickness is formed. During this process, the flowable thermoplastic material will encase at least the base parts 19b of the attachment elements 18 but will usually also coat the tension member 20 and the eyelets 19a. In an embodiment, at least the base 19b of the attachment elements 18 is made of the same thermoplastic material as the container walls, or at least a compatible material, such that the thermoplastic material used to form the walls of the container 12 and the attachment elements 18 form a chemical bond. The base 19b will effectively melt and form an integral part of the wall of the container 12. Alternatively, the attachment elements 18 may be designed so that the thermoplastic material of the container walls forms a mechanical bond with the attachment elements 18 as it solidifies. The tension member 20 may also be made of the same thermoplastic material as the container walls or a compatible material such that the tension member 20 is bonded to the eyelets 19a during the molding process. After the container 12 is molded and the thermostatic material has cooled, the attachment elements 18 and any utility elements 22 are detached from the mold parts 26a, 26b by releasing the securing elements 34. The mold parts 26a, 26b can then be separated and the container 12 de-molded. An opening is formed in the inlet 16 of the container 12 by removing the section of material through which the second end of the tension member extends and the second end region 20a of the tension member 20 is trimmed.

The method as outlined above can be modified in various ways.

In one alternative embodiment, the tension member 20 is threaded through the eyelets 19a in a loop and both ends passed out of the mold 24 at a suitable location where an aperture in the container 12 is to be produced after molding, such as the inlet 16. In this case, both ends of the tension member 20 can be used to stretch and tension the tension member 20 and secured in place, say by means of a clamp or the like, before the container 12 is molded. After molding of the container 12 is complete, both ends of the tension member 20 can be trimmed.

In a further alternative, the tension member 20 is not fused or bonded to the attachment elements 18 during the molding process. In this embodiment, the tension member 20 may not be fully tensioned prior to molding the container body 14 but tensioned sufficiently that it does not interfere with the molding process and one or both ends secured outside the mold 24. After molding of the container body 14 is complete, the inlet 16 aperture is produced and the tension member 20 is fully tensioned and secured in position. Typically, at least one end of the tension member 20 will extend through the inlet 16 and can be used to stretch and tension the tension member before the tension member is secured in its tensioned state. In this case, part of the tension member 20 proximal the free end 20a could be clamped to another portion of the tension member 20 inside the container using a suitable clamp or clip, or it may be secured to an attachment element 18 located near the inlet. If desired, a special attachment element for use in tensioning can be located proximal to the inlet 16 for this purpose. If two ends of the tension member 20 extend outside of the container body 14 through the inlet 16, these may be clamped together once the tension member 20 is tensioned so that the tension member 20 forms a continuous loop and any excess trimmed.

In a still further embodiment, one or both of the mold parts 26a, 26b is provided with an access port (indicated schematically by broken lines 40 in FIG. 6) having a flap or other closure member which can be opened to allow access to the interior cavity 32 of the mold 24 after the mold parts 26a, 26b have been closed together. The access port or ports 40 provide access to the tension member 20 inside the mold cavity 32 so that it can be fully tensioned and secured in its tensioned state. In this embodiment, it may not be necessary for any part of the tension member 20 to be fed outside of the mold 24. Once the tension member 20 has been tensioned and secured, the access port or ports 40 is/are closed and the container body 14 is molded. In this embodiment, the tension member 20 may or may not be bonded or fused to the attachment elements 18 during molding of the container body 14. In a further alternative, the tension member 20 may be affixed to each attachment element 18 using an adhesive or a mechanical fastening prior to molding of the container body 14. In a still further embodiment, the tension member 20 may be elastic and may be stretched into position before the mold parts 26a, 26b are fully closed such that the once the mold parts 26a, 26b are fully closed the tension member 20 is still sufficiently tensioned to reduce bulging of the container walls.

It is a particular advantage of the method of manufacture according to the disclosure that the attachment elements 18 can be positioned anywhere in the container 12 so that possible weak spots of the container 12, e.g., side walls of the container 12 with low material stress, can be reinforced precisely. This method enables a fairly complex reinforcing tension structure 17 to be produced, which could not be easily introduced into the container 12 after molding. Since the attachment elements 18 and the tension member 20 are integrated inside of container 12 as it is molded, the time needed for the manufacturing process can be greatly reduced in comparison with known methods of reinforcement.

It is a further advantage that the tension member 20 and the attachment elements 18 are initially separate, only being connected after the attachment elements are secured to part of the mold. This enables different special tension structures 17 to be produced for different containers using standard tension members 20 and attachment elements 18. There is no requirement to manufacture a specific tension structure 17 for use in a given container. Using the method of manufacture according to the disclosure, a reinforcing tension structure 17 which is precisely adapted to reinforce a container 12 of any given shape can be produced. The reinforcing tension structure 17 can be as complex or as simple as required.

FIGS. 2 to 5 illustrate an exemplary tension structure 17 for an L-shaped container 12 which is relatively long and thin and which would be difficult to reinforce using known reinforcing methods. As illustrated, the tension member 20 connects the attachment elements 18 in a meandering pattern. In this regard, the tension member 20 can be arranged to extend between attachment elements 18 in any suitable direction, including laterally across the container 12 from one wall 36 to another 38, in a diagonal fashion from one wall 36 to another 38, or even between attachment elements 18 on the same wall. The designer will be able to create a suitable structure 17 to reinforce any given container shape in an optimal fashion using known engineering principles.

As can be seen from the illustrations, the attachment elements 18 and the tension member 20 do not require much space inside of the container 12 and so have little impact on the volume of the container 12. This is a big advantage compared to other known solutions.

Though containers 12 may typically have at least two attachment elements 18 interconnected by a tension member 20, it is possible that the principles outlined above can be adapted to enable a tensioning structure 17 be produced using only one attachment element 18. For example, a single attachment element 18 may be located on one mold part 26a or 26b where it will become embedded or fused into a wall of the container 12. The tension member 20 is attached to the attachment element 18 and its ends passed out of the mold 26 at a position spaced from the attachment element 18 where an opposing wall of the container 12 is to be formed. After the container 12 is molded and released from the mold 24, the tension member 20 is stretched and tensioned and the ends secured together outside of the opposing wall. The tension member 20 will be effective to prevent the walls from bulging. Alternatively, the tension member 20 may be fully tensioned prior to molding and the arrangement configured such that the tension member 20 is fused into the wall on the side where it passes out of the mold 24.

The attachment elements 18 and the tension member 20 can be made from any suitable materials suitable for submersion in the fluid to be held by the container 12.

Though the method is particularly suitable for use with rotational molding of the container body 14, it may be adapted for use with other molding techniques provided the attachment elements 18 can be secured inside the mold cavity 32.

All references cited herein are incorporated herein in their entireties. If there is a conflict between definitions herein and in an incorporated reference, the definition herein shall control.

What is claimed is:

1. A method of forming a reinforced thermoplastic container, the method comprising:

providing a mold having at least two mold parts, each mold part having an inner side and an outer side;
releasably securing at least one attachment element to the inner side of at least one of the mold parts;
connecting a tension member to the at least one attachment element after releasably securing the at least one attachment element to the inner side of the at least one of the mold parts;
adding a thermoplastic material onto the inner side of the at least one of the mold parts while the tension member is connected to the at least one attachment element;
closing the at least two mold parts to define a mold cavity after connecting the tension member to the at least one attachment element;
heating the thermoplastic material after closing the at least two mold parts; and
distributing the heated thermoplastic material at the inner side of the at least two mold parts after closing the at least two mold parts to create a molded body of the reinforced container and to fixedly integrate the at least one attachment element into the molded body of the reinforced container.

2. The method of claim 1, wherein releasably securing the attachment element to the inner side of the at least one of the mold parts comprises securing the attachment element to the inner side of the at least one of the mold parts with a safety pin, a magnet, or a bayonet connection.

3. The method of claim 1, further comprising:
cooling the thermoplastic material after distributing the thermoplastic material at the inner side of the at least two mold parts; and
detaching the at least one attachment element from the at least one mold part.

4. The method of claim 1, wherein:
releasably securing at least one attachment element to the inner side of at least one of the mold parts comprises releasably securing at least two attachment elements to the mold parts; and
connecting a tension member to the at least one attachment element comprises attaching the tension member to a plurality of attachment elements.

5. The method of claim 4, wherein releasably securing at least two attachment elements to the mold parts comprises securing the at least two attachment elements to the mold parts to be positioned on opposing walls of the molded body of the reinforced container.

6. The method of claim 1, wherein connecting a tension member to the at least one attachment element comprises connecting the tension member alternately to attachment elements positioned on opposing walls of the molded body of the reinforced container.

7. The method of claim 6, wherein connecting a tension member to the at least one attachment element comprises connecting the tension member to a plurality of attachment elements in a meandering pattern.

8. The method of claim 1, wherein the method comprises tensioning the tension member after connecting the tension member to the at least one attachment element.

9. The method of claim 1, wherein connecting a tension member to the at least one attachment element comprises connecting a tension member comprising the thermoplastic material.

10. The method of claim 1, further comprising attaching the at least one tension member to the at least one attachment element by a chemical bond.

11. The method of claim 1, wherein connecting a tension member to the at least one attachment element comprises connecting a tension member comprising another thermoplastic material compatible with the thermoplastic material.

12. A method of forming a reinforced thermoplastic container, the method comprising:
providing a mold having at least two mold parts, each mold part having an inner side and an outer side;
releasably securing at least one attachment element to the inner side of at least one of the mold parts;
connecting a tension member to the at least one attachment element after releasably securing the at least one attachment element to the inner side of the at least one of the mold parts;
tensioning the tension member and securing at least one end of the tension member outside of the mold cavity;
adding a thermoplastic material onto the inner side of the at least one of the mold parts while the tension member is connected to the at least one attachment element;
closing the at least two mold parts to define a mold cavity after connecting the tension member to the at least one attachment element;
heating the thermoplastic material after closing the at least two mold parts; and
distributing the heated thermoplastic material at the inner side of the at least two mold parts after closing the at least two mold parts to create a molded body of the reinforced container.

13. A method of forming a reinforced thermoplastic container, the method comprising:
providing a mold having at least two mold parts, each mold part having an inner side and an outer side, wherein at least one of the mold parts comprises a port having an openable closure member;
releasably securing at least one attachment element to the inner side of at least one of the mold parts;
connecting a tension member to the at least one attachment element after releasably securing the at least one attachment element to the inner side of the at least one of the mold parts;
adding a thermoplastic material onto the inner side of the at least one of the mold parts while the tension member is connected to the at least one attachment element;
closing the at least two mold parts to define a mold cavity after connecting the tension member to the at least one attachment element;
accessing the mold cavity through the port after closing the at least two mold parts;
fixing the tension member within the mold cavity;
heating the thermoplastic material after closing the at least two mold parts; and
distributing the heated thermoplastic material at the inner side of the at least two mold parts after closing the at least two mold parts and fixing the tension member within the mold to create a molded body of the reinforced container.

14. The method of claim 1, further comprising distributing the thermoplastic material on the tension member and the at least one attachment element to form at least one cross brace within the body of the container.

15. The method of claim 1, wherein connecting a tension member to the at least one attachment element comprises connecting a tension rope to the at least one attachment element.

16. A method of manufacturing a thermoplastic container having an internal tension structure, the method comprising:
assembling a mold comprising at least two mold parts to define a mold cavity;

releasably securing a plurality of attachment elements to inner surfaces of the mold parts at positions defining walls of a container body;

connecting an elongate tension member to the plurality of the attachment elements after releasably securing the plurality of attachment elements to inner surfaces of the mold parts; and molding the container body from a thermoplastic material within the mold cavity and integrating the attachment elements into the walls of the container body.

17. The method of claim 16, further comprising heating the thermoplastic material.

18. The method of claim 17, further comprising distributing the heated thermoplastic material within the mold cavity.

19. The method of claim 18, further comprising:

cooling the thermoplastic material after distributing the heated thermoplastic material within the mold cavity; and detaching at least one of the attachment elements from the inner surfaces of the mold parts.

\* \* \* \* \*